United States Patent Office 3,002,944  
Patented Oct. 3, 1961

3,002,944  
HYDROXYTITANIUM ACYLATES IN CIS-CONJUGATED DIENE POLYMER COMPOSITIONS AND PROCESS OF PREPARATION  
Gerard Kraus and Donald E. Carr, Bartlesville, Okla., assignors to Phillips Petroleum Company, a corporation of Delaware  
No Drawing. Filed May 1, 1958, Ser. No. 732,116  
19 Claims. (Cl. 260—23.7)

This is a continuation in part of our copending United States patent application, Serial No. 500,279, filed April 8, 1955, now abandoned.

This invention is directed to a novel cis-conjugated diene polymer composition of high tensile strength and abrasion resistance. More particularly, it is directed to the incorporation of hydroxytitanium acylate into a natural rubber composition or into a synthetic cis-conjugated diene polymer composition and to the improved product resulting therefrom.

Hydroxytitanium acylates, particularly hydroxytitanium stearate, hydroxytitanium cocoanut acylate, and hydroxytitanium soy acylate, when employed in natural rubber-carbon black compositions, have been found to give products which have greater abrasion resistance and, in general, improved tensile strength, particularly hot tensile strength, improved tear tensile strength, lower heat build-up, and a higher percentage of bound rubber than the corresponding compositions in which no hydroxytitanium acylates are present. Particularly noteworthy is the improvement in abrasion resistance on stocks which have been aged. We have also found that when hydroxytitanium acylates are incorporated into compositions comprising carbon black and synthetic cis-conjugated diene polymers such as cis-polybutadiene and cis-polyisoprene, unexpected improvements in tensile and hysteresis properties are realized. The improvements realized by the incorporation of hydroxytitanium acylates in cis-conjugated diene polymer-carbon black compositions are not observed in similar compositions wherein synthetic rubber of a different type, such as butyl rubber or GR-S is used instead of a cis-conjugated diene polymer.

The principal object of this invention is to provide from a cis-conjugated diene polymer a rubber composition having improved physical properties.

A further object is the preparation of this composition by incorporating a hydroxytitanium acylate into a natural rubber-filler composition.

Another object is to provide a synthetic rubber from cis-conjugated diene polymer, said rubber having improved hysteresis properties.

A more specific object is the preparation of a natural rubber-carbon black-hydroxytitanium acylate composition having certain improved physical properties.

Other objects, advantages and features will be apparent to those skilled in the art from the following description and claims.

The hydroxytitanium acylates employed in this invention can be represented by the formula

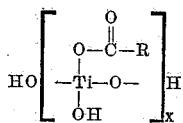

where $x=5-100$ and R represents an alkyl or alkenyl radical or a hydroxy-substituted alkyl or alkenyl radical of the type found in cocoanut oil acids, soy oil acids, linseed oil acids, and castor oil acids, and especially exemplified by stearic acid. These acids contain from 6 to 24 carbon atoms. At the lower end of this range are caproic, caprylic, and capric acids which contain 6, 8, and 10 carbon atoms, respectively. The intermediate portion of this range is represented by lauric, myristic, and palmitic acids which contain 12, 14, and 16 carbon atoms, respectively. The upper portion of the range is represented by stearic, oleic, linoleic, linolenic, ricinoleic, and dihydroxy stearic, all 18-carbon acids. The top of the range is exemplified by arachidic, erucic, and lignoceric acids which contain 20, 22, and 24 carbons, respectively. The preferred compounds of this class are hydroxytitanium soy acylates, hydroxytitanium cocoanut acylates, and hydroxytitanium stearate per se. Compounds of this type can be made by the process described in U.S. 2,621,194.

The amount of hydroxytitanium acylate employed is generally in the range between 0.5 and 10 parts by weight per 100 parts rubber, with an amount in the range from 1.5–5 parts by weight per 100 parts rubber being generally preferred.

By the term "cis-conjugated diene polymer" as used broadly in this disclosure and in the claims we mean to include natural rubber as well as the synthetic rubbers prepared from conjugated dienes having from 4 to 8, inclusive, preferably 4 to 6, inclusive, carbon atoms per molecule which are polymerized under conditions which result in a polymer having a high, i.e., at least 80 percent and preferably at least 90 percent, cis-configuration as determined by infrared analysis. Included in this group of synthetic rubbers are cis-polybutadiene and cis-polyisoprene, sometimes referred to as "synthetic natural rubber." Preferably the polymer is a hydrocarbon.

Natural rubber is derived chiefly from the *Hevea brasiliensis* and is available commercially in crude form as crepe or smoked sheet.

Synthetic cis-polymers can be prepared by polymerizing a conjugated diene or mixtures of conjugated dienes having from 4 to 8 carbon atoms in the presence of specific catalyst systems comprising an organometal and titanium tetrahalide. The conjugated dienes of the monomer systems preferably have from 4 to 6, inclusive, carbon atoms per molecule, such as 1,3-butadiene, 2-methyl-1,3-butadiene (isoprene), 2,3-dimethyl-1,3-butadiene, 2-methyl-1,3-pentadiene and the like, although higher molecular weight monomers such as 2,3-dimethyl-1,3-pentadiene and 2-methyl-3-ethyl-1,3-pentadiene can be used. A rubbery polymer containing as high as 93 percent and higher cis-1,4-addition can be prepared from 1,3-butadiene polymerized in the presence of a catalyst composition comprising (a) an organometal compound corresponding to the formula $R_nM$, wherein R is an alkyl radical containing up to and including 12 carbon atoms, M is a metal selected from the group consisting of aluminum, mercury and zinc, and n is an integer equal to the valence of the metal M, and (b) titanium tetraiodide. The contacting of the catalyst with the 1,3-butadiene preferably occurs in the presence of a hydrocarbon diluent which does not inactivate the catalyst. The alkyl groups can be either straight or branched chain alkyls, for example, methyl, ethyl, propyl isopropyl, n-butyl, isobutyl, pentyl, isohexyl, n-heptyl, n-octyl, or tert-dodecyl. The alkyl groups can be the same or different, such as isobutyl zinc. Examples of suitable organometal compounds include triethylaluminum, triisobutylaluminum, dimethylmercury, diethylmercury, diisopropylmercury, di-n-butylmercury, diisobutylmercury, di-n-hexylmercury, di-n-dodecylmercury, dimethylzinc, diethylzinc, diisopropylzinc, di-n-butylzinc, di-n-hexylzinc, di-n-octylzinc, di-n-decylzinc, and the like. Mixtures of organometal compounds can be employed in the catalyst system.

The ratio of the organometal compound to titanium tetraiodide in the catalyst system is usually in the range of 1.0 to 50 on a mol basis, preferably 1.0 to 15. The concentration of the total catalyst composition, i.e., organometal compound and titanium tetraiodide, is usually in the range of about 0.05 to 10 weight percent, preferably in the range of 0.05 to 5 weight percent, based on the total amount of 1,3-butadiene charged to the polymerization reactor. The polymerization can be carried out at any temperature within the range of 0 to 150° C. and can also be carried out at very low temperatures, e.g. from −80 to 0° C. so as to provide polymers having very high cis-1,4-configuration. It is preferred to carry out the polymerization in the presence of a hydrocarbon diluent, although the polymerization can be carried out without the use of such a diluent. Depending upon the polymerization temperature and the particular hydrocarbon diluent used, the polymerization can be conducted in either the liquid or the solid phase. The polymerization reaction can be carried out under autogenous pressure or any suitable pressure sufficient to maintain a reaction mixture substantially in the liquid and/or solid phase. The pressure will thus depend upon the particular diluent being employed and the temperature at which the polymerization is conducted. The pressure in the polymerization reactor will normally be the vapor pressure of the reaction mixture at the polymerization temperature, no outside source of pressure being necessary. However, higher pressures can be employed, if desired, these pressures being obtained by some such suitable means as the pressurization of the reactor with a gas which is inert with respect to the polymerization reaction.

Diluents suitable for use in the polymerization process are hydrocarbons which are not detrimental to the polymerization reaction. Suitable diluents include aromatics, such as benzene, toluene, xylene, ethylbenzene and mixtures thereof. It is also within the scope of the invention to use straight and branched chain paraffins which contain up to and including 10 carbon atoms per molecule. Examples of paraffins which can be utilized include propane, normal butane, normal pentane, isopentane, normal hexane, isohexane, 2,2,4-trimethylpentene (isooctane), normal decane, and the like. Mixtures of these paraffinic hydrocarbons can also be employed as diluents in the practice of the process of this invention. Cycloparaffins, such as cyclohexane, methylcyclohexane, and the like, can also be used. Furthermore, mixtures of any of the aforementioned hydrocarbons can be used as diluents.

Cis-polyisoprene can be formed in polymerization processes similar to those above described, using a catalyst system comprising an alkylaluminum, such as triethylaluminum and triisobutylaluminum, with titanium tetrachloride. In this polymerization system the ratio of organometal to titanium tetrachloride should be at least 2.5:1 on a mol basis.

The above-described polymerization employing the catalyst system comprising an organometal and titanium tetrachloride can also be adapted for the polymerization of pentadiene and higher conjugated dienes to cis-polymers useful in our invention.

As defined above, the materials which we have found to be improved by incorporating therein a hydroxytitanium acylate are natural and synthetic rubbery polymers having a high degree of cis-1,4 configuration. By the term "rubbery polymer" we mean to include elastomeric, vulcanizable polymeric material which after vulcanization, i.e., cross-linking, possesses the properties normally associated with vulcanized rubber, including materials which when compounded and cured exhibit reversible extensibility at 80° F. of over 100 percent of a specimen's original length with a retraction of at least 90 percent within one minute after release of the stress necessary to elongate to 100 percent.

The percent of unsaturation that is cis, trans or vinyl unsaturation can be determined by infrared spectroscopy according to any one of a number of methods known in the art. One such method for polyisoprene and natural rubber is described in the article of Binder and Ransaw, "Analysis of Polyisoprenes by Infrared Spectroscopy," Analytical Chemistry, 29, 503–508 (1957). The method used for determination of cis content of polybutadiene was as follows:

The polymer samples were dissolved in carbon disulfide to form a solution having 25 grams of polymer per liter of solution. The infrared spectrum of each of the solutions (percent transmission) was then determined in a commercial infrared spectrometer.

The percent of the total unsaturation present as trans 1,4- was calculated according to the folowing equation and consistent units:

$$\epsilon = \frac{E}{tc}$$

where $\epsilon$=extinction coefficient (liters-mols$^{-1}$-centimeters$^{-1}$; $E$=extinction (log $I_0/1$); $t$=path length (centimeters); and $c$=concentration (mols double bond/liter). The extinction was determined at the 10.35 micron band using the extinction coefficient of 133(liters-mols$^{-1}$-centimeters$^{-1}$).

The percent of the total unsaturation present as 1,2- (or vinyl) was calculated according to the above equation, using the 11.0 micron band and an extinction coefficient of 184(liters-mols$^{-1}$-centimeters$^{-1}$).

The absorption band maximum due to cis unsaturation varies from 13.5 microns to 13.8 microns, depending upon the percent of trans and vinyl unsaturation present. Cis unsaturation was determined by measuring the area of the entire band between 12.0 and 15.75 microns and correcting for the presence of the already measured trans and vinyl unsaturation. The extinction coefficient $\epsilon$ for cis unsaturation was determined as described above except the E was determined by using the formula log $(A_0/A)$, where $A_0$ was the total area in the 12.00 to 15.75 micron region and A was the area of the unabsorbed portion. The extinction coefficient thus calculated for cis unsaturation was 10.1 liters-mols$^{-1}$-centimeters$^{-1}$.

The rubber compositions of this invention may be prepared in several ways. For example, the carbon black may be added to the rubber while the rubber is in a dispersion, such as in a solution or in latex form or added dry by a mill mixing procedure, using a roll mill or Banbury mill. The hydroxytitanium acylates are added along with the other compounding ingredients which include vulcanization agents such as sulfur, vulcanization accelerators, anti-oxidants, accelerator-activators, etc. Alternatively the hydroxytitanium acylate can be added in a remilling operation subsequent to the incorporation of the other compounding ingredients. A masterbatch of the rubber and carbon black is preferably prepared first and the other ingredients incorporated afterward.

Any reinforcing carbon black is applicable in these compositions, e.g., furnace black and channel black. High abrasion and super abrasion furnace blacks are preferred.

While this invention is not dependent upon any particular mechanism or explanation of the action of hydroxytitanium acylates, it appears that these hydroxytitanium acylates produce additional linkages between the carbon black surface and the rubber molecules. It is also possible that these hydroxytitanium acylates enhance the dispersion of the black in the rubber.

One method of determining bound rubber is to extract a weighed sample of the rubber-carbon black composition with a suitable solvent such as benzene. The rubber which is non-extractable is regarded as bound rubber. The presence of a hydroxytitanium acylate such as hydroxytitanium stearate in a natural rubber-carbon black composition results in an appreciable increase in bound rubber over a similar composition in which the additive is not present. A corresponding effect has not been demonstrated in compositions of carbon black and copolymers of butadiene and styrene.

The addition of a hydroxytitanium acylate to a natural rubber-carbon black composition also results in an increase in the Mooney value over a similar composition without the hydroxytitanium acylate. A corresponding effect has not been demonstrated in synthetic rubber-carbon black compositions and, therefore, appears to be specific to natural rubber-carbon black compositions. That the carbon black is essential to an increased Mooney value may be demonstrated by determining the Mooney value of a natural rubber sample, with and without a hydroxytitanium acylate, but containing no black. There is no appreciable difference in the Mooney values of the two compositions.

As hereinbefore stated, hydroxytitanium acylates such as hydroxytitanium stearate, hydroxytitanium cocoanut acylate, and hydroxytitanium soy acylate, when present in natural rubber-carbon black compositions, produce certain properties which are superior to those of similar compositions without the hydroxytitanium acylates. The abrasion resistance, particularly on the aged stocks, is greatly improved. Improvements have also been demonstrated in tensile strength and heat build-up. Resilience and tear tensile are also significantly improved.

These hydroxytitanium acylates, when incorporated into synthetic conjugated diene polymers having at least 80 percent cis-1,4 configuration give unexpected improvements in tensile strength and hysteresis properties. This behavior of synthetic rubber compositions from cis-polymers is quite surprising in view of the negative effect which these acylates have on tensile properties of emulsion polymerized polymers having low cis content, such as butyl rubber and GR–S. Emulsion polymerization of 1,3-butadiene gives a polymer with from about 60 to about 80 percent trans 1,4-addition, from about 5 to about 20 percent cis-1,4-addition, and from about 15 to about 20 percent 1,2-addition. Sodium-catalyzed polybutadiene has from about 60 to about 75 percent 1,2-addition, the remainder being cis and trans 1,4-addition. When potassium and other alkali metals are employed as catalysts, the latter ratios may vary to some degree, but no polybutadiene containing more than about 35 percent of cis-1,4 configuration has been obtained. Alfin-catalyzed polybutadiene has from about 65 to about 75 percent trans 1,4-addition, from about 5 to about 10 percent cis-1,4-addition, and from about 20 to about 25 percent 1,2-addition. For a more complete discussion of the configuration of polybutadiene, reference is made to an article by J. L. Binder appearing in Industrial and Engineering Chemistry, No. 46, 1727 (August 1954).

Since similar improvements are made in natural rubber, there is a correlation between the benefits of our invention and the cis-1,4 configuration of the polymer. Hevea rubber has been analyzed by the infrared method and estimated to contain 97 percent polymer formed by cis-1,4-addition and 3 percent by 3,4-addition, assuming that natural rubber is formed by polymerization of individual isoprene molecules.

Advantages of this invention are illustrated by the following examples. The reactants, and their proportions, and other specific conditions are presented as being typical and should not be construed to limit the invention unduly.

*Example I*

Hydroxytitanium stearate was investigated as a compounding ingredient in super abrasion furnace black (Philblack E, a trademark of Phillips Petroleum Company)-natural rubber compositions. The following compounding recipe was employed:

| | Parts by weight |
|---|---|
| Natural rubber (#1 smoked sheet) | 100 |
| Philblack E | 45 |
| Zinc oxide | 4 |
| Flexamine [1] | 1 |
| Pine tar | 3 |
| Sulfur | 2 |
| Santocure [2] | 0.5 |
| Stearic acid | 3 |
| Hydroxytitanium stearate | 0, 1, 2, 4 |

The samples were milled, cured 30 minutes at 307°

[1] Physical mixture containing 65 percent of a complex diarylamine-ketone reaction product and 35 percent of N,N'-diphenyl-p-phenylenediamine.
[2] N-cyclohexyl-2-benzothiazylsulfenamide.

F., and physical properties determined. Results were as follows:

| | Hydroxytitanium stearate, parts | | | |
|---|---|---|---|---|
| | 0 | 1 | 2 | 4 |
| Unaged samples: | | | | |
| Compression set, percent | 19.3 | 20.1 | 20.0 | 21.7 |
| 300% modulus | 1,640 | 1,560 | 1,710 | 1,580 |
| Tensile, p.s.i. 80° F | 4,430 | 4,425 | 4,400 | 4,300 |
| Elongation, percent | 565 | 585 | 575 | 585 |
| 200° F. maximum tensile, p.s.i | 3,840 | 4,040 | 3,780 | 4,500 |
| Δ T, F | 49.3 | 49.3 | 47.6 | 45.9 |
| Resilience, percent | 62.1 | 62.0 | 64.4 | 65.1 |
| Mooney | 49.5 | 53.5 | 50.5 | 50.0 |
| Bound rubber, percent [1] | 40.3 | 44.3 | 44.9 | 44.7 |
| Scorch at 250° F.: | | | | |
| Minimum Mooney | 59.5 | 60 | 58.5 | 57.5 |
| Minutes to scorch | 16.5 | 17 | 15 | 15.5 |
| Extrusion at 195° F.: | | | | |
| Inches/minute | 30.1 | 28.8 | 28 | 28.6 |
| Grams/minute | 55 | 52 | 52 | 53 |
| Tear tensile, p.s.i.[2] | 2,600 | 3,160 | 3,280 | 2,820 |
| Abrasion loss, grams [3] | 10.29 | 9.87 | 9.95 | 9.54 |
| Oven aged 24 hours at 212° F.: | | | | |
| 300% modulus | 1,670 | 1,740 | 1,850 | 1,590 |
| Tensile, p.s.i., 80° F | 2,550 | 2,510 | 2,940 | 3,120 |
| Elongation, percent | 400 | 410 | 430 | 480 |
| Δ T, F | 47.9 | 48.7 | 47.3 | 46.3 |
| Resilience, percent | 64.7 | 65.7 | 66.2 | 67.0 |
| Abrasion loss, grams | 10.20 | 9.83 | 8.98 | 5.22 |

[1] Carbon black and hydroxytitanium stearate, when used, are milled into the rubber. The unvulcanized compositions are extracted with benzene and the rubber that is not extractable is regarded as bound rubber. The weight of the unextracted polymer divided by the total weight of original polymer gives the percent bound rubber. The value obtained is indicative of the adsorption of rubber onto the black and also of the promotion of reinforcement.

[2] Method similar to that of Buist, Trans. Inst. Rubber Ind. 20, 155–172 (1945). A small tensile specimen was used (ASTM, Die Size D) with a 22 mil deep cut at the center of the gauge length, perpendicular to the direction of stretch. The specimens were pulled to destruction at a speed of 20 inches per minute on an Instron tester. The tear strength was computed as Tear Strength=L/w(t-d) where L is the load at break, w is the width of the specimen, t is the thickness, and d is the depth of the cut.

[3] The modified Goodyear Angle Abrasion Test was used for obtaining these values; they are determined by noting the loss in weight of a doughnut-shaped rubber wheel which has been subjected to the abrasive action of a carborundum wheel on the angle abrader for a certain length of time. Hence, the lower the abrasion loss, the better the rubber. The normal test conditions are: 15 degree angle, 33¼ pounds load, and 3000 revolutions.

*Example II*

Hydroxytitanium stearate was investigated as a compounding ingredient in a high abrasion furnace black (Philblack O, a trademark of Phillips Petroleum Company)-natural rubber composition. Two runs were made, one using two parts of hydroxytitanium stearate and the other omitting the additive. In these runs 50 parts by weight of Philblack O was used per 100 parts of natural rubber (#1 smoked sheet). Otherwise the compounding recipe was the same as given in Example I. The stocks were milled, cured 30 minutes at 307° F., and physical properties determined. Results were as follows:

|  | Hydroxytitanium stearate, parts | |
|---|---|---|
|  | 2 | 0 |
| Unaged samples: |  |  |
| Compression set, percent | 16.6 | 16.3 |
| 300% modulus | 1,875 | 1,875 |
| Tensile, p.s.i., 80° F | 3,890 | 4,050 |
| Elongation, percent | 515 | 530 |
| 200° F maximum tensile, p.s.i. | 3,610 | 3,640 |
| Δ T, F | 42.6 | 45.9 |
| Resilience, percent | 69.8 | 66.7 |
| Abrasion loss, grams [1] | 9.46 | 10.20 |
| Bound rubber, percent [2] | 40.7 | 32.4 |
| Scorch at 250° F.: |  |  |
| Minimum Mooney | 56 | 58.5 |
| Minutes to scorch | 16.5 | 16 |
| Extrusion at 195° F.: |  |  |
| Inches/minute | 37 | 37.2 |
| Grams/minute | 67.5 | 69.8 |
| Tear tensile, p.s.i. | 2,990 | 2,650 |
| Oven aged 24 hours at 212° F.: |  |  |
| 300% modulus | 1,875 | 1,750 |
| Tensile, p.s.i. | 2,840 | 2,090 |
| Elongation, percent | 410 | 340 |
| Δ T, F | 40.5 | 44.6 |
| Resilience, percent | 72.7 | 70.2 |
| Abrasion loss, grams | 6.71 | 11.05 |

[1] Determined as in Example I.
[2] Determined as in Example I.

*Example III*

Hydroxytitanium stearate, hydroxytitanium cocoanut acylate, hydroxytitanium soy acylate, hydroxytitanium castor acylate, and hydroxytitanium linseed acylate were investigated as compounding ingredients in super abrasion furnace black (Philblack E)-natural rubber compositions in which the following compounding recipe was employed:

|  | Parts by weight |
|---|---|
| Natural rubber (#1 smoked sheet) | 100 |
| Philblack E | 40 |
| Hydroxytitanium acylate | 0, 2 |
| Zinc oxide | 4 |
| Stearic acid | 3 |
| Flexamine | 1 |
| Sulfur | 2 |
| Santocure | 0.5 |

The stocks were milled, cured 30 minutes at 307° F., and physical properties determined. The following results were obtained:

| Hydroxytitanium acylate | Comp. set, percent | 300% modulus, p.s.i. | Tensile, p.s.i. | Elongation, percent | NBS abrasion rating[1] |
|---|---|---|---|---|---|
| Hydroxytitanium stearate | 13.5 | 660 | 3,090 | 790 | 180 |
| Hydroxytitanium cocoanut acylate | 10.0 | 790 | 3,510 | 800 | 160 |
| Hydroxytitanium soy acylate | 15.1 | 610 | 2,960 | 820 | 140 |
| Hydroxytitanium castor acylate | 10.7 | 670 | 2,790 | 800 | 110 |
| Hydroxytitanium linseed acylate | 13.2 | 650 | 2,770 | 770 | 130 |
| None | 9.8 | 750 | 2,970 | 750 | 100 |

[1] A National Bureau of Standards Abrader was employed using #2½ garnet paper (ASTM D-394-47, adopted 1940, revised 1946, 1947). The higher the rating, the more abrasion-resistant the rubber.

*Example IV*

Hydroxytitanium stearate and hydroxytitanium cocoanut acylate were investigated in Philblack O-butyl rubber compositions. The following compounding recipe was employed:

|  | Parts by weight |
|---|---|
| Butyl rubber [1] | 100 |
| Philblack O | 50 |
| Zinc oxide | 5 |
| Stearic acid | 1 |
| Sulfur | 2 |
| Methyl Tuads [2] | 1 |
| Captax [3] | 1 |
| Hydroxytitanium acylate | 0, 2 |

[1] Isobutylene-isoprene copolymer having a molecular weight of 505,000 and an unsaturation of 1.38%.
[2] Tetramethyl thiuram disulfide.
[3] 2-mercaptobenzothiazole.

The following results were obtained after milling the stocks and curing them 30 minutes at 307° F.:

| Hydroxytitanium acylate | Comp. set, percent | 300% modulus, p.s.i. | Tensile, p.s.i. | Elongation, percent | NBS abrasion rating |
|---|---|---|---|---|---|
| Hydroxytitanium stearate | 16.1 | 950 | 2,140 | 620 | 96 |
| Hydroxytitanium cocoanut acylate | 16.3 | 970 | 2,260 | 640 | 94 |
| None | 15.6 | 1,080 | 2,300 | 580 | 100 |

*Example V*

Hydroxytitanium stearate was investigated as a compounding ingredient in Philblack E-butadiene/styrene rubber compositions. Compounding was effected in accordance with the following recipe:

|  | Parts by weight |
|---|---|
| Butadiene/styrene rubber (GR-S) [1] | 100 |
| Philblack E | 40 |
| Sulfur | 1.75 |
| Zinc oxide | 3 |
| Stearic acid | 1 |
| Flexamine | 1 |
| Santocure | 0.85 |
| Hydroxytitanium stearate | 0,2,5 |

[1] A 71/29 butadiene/styrene rubber prepared by emulsion polymerization at 122° F. and having a Mooney value (ML-4) of 48.

The stocks were milled, cured 30 minutes at 307° F., and physical properties determined. Results were as follows:

| Hydroxytitanium acylate | Comp. set, percent | 300% modulus, p.s.i. | Tensile, p.s.i. | Elongation, percent | NBS abrasion rating |
|---|---|---|---|---|---|
| Hydroxytitanium stearate, 2 parts | 13.0 | 755 | 3,345 | 790 | 99 |
| Hydroxytitanium stearate, 5 parts | 14.0 | 720 | 2,860 | 735 | 67 |
| None | 12.0 | 730 | 3,760 | 880 | 100 |

A comparison of Example III (natural rubber-hydroxytitanium acylates) and Examples IV and V (synthetic rubber-hydroxytitanium acylates) illustrates the improved abrasion resistance and generally improved tensile properties of the natural rubber compositions over the synthetics.

*Example VI*

Different quantities of hydroxytitanium stearate were employed in compounding Philblack E-natural rubber compositions. The following recipe was employed:

|  | Parts by weight |
|---|---|
| Natural rubber (#1 smoked sheet) | 100 |
| Philblack E | 40 |
| Zinc oxide | 4 |
| Stearic acid | 3 |
| Flexamine | 1 |
| Sulfur | 2 |
| Santocure | 0.6 |
| Hydroxytitanium stearate | 0,2,5 |

After milling and curing the stocks 30 minutes at 307° F., physical properties were determined. Results were as follows:

| Hydroxytitanium acylate | Comp. set, percent | 300% modulus, p.s.i. | Tensile, p.s.i. | Elongation, percent | NBS abrasion rating |
|---|---|---|---|---|---|
| Hydroxytitanium stearate, 2 parts | 6.7 | 960 | 3,680 | 760 | 185 |
| Hydroxytitanium stearate, 5 parts | 7.3 | 930 | 3,640 | 770 | 173 |
| Control (no additive) | 7.0 | 890 | 3,100 | 710 | 100 |

Note that the compositions containing hydroxytitanium stearate showed improvement in tensile strength and abrasion resistance over a similar composition in which no additive was included.

*Example VII*

To determine the effect of hydroxytitanium stearate on the Mooney value of natural and synthetic rubber-carbon black compositions, the several compositions described below (quantities expressed as parts by weight per 100 parts rubber) were prepared by mill mixing and their Mooney values determined at 212° F. Results were as follows:

| Composition: | Mooney value at 212° F., MS-1½ |
|---|---|
| #1 smoked sheet Philblack E, 40 parts | 43 |
| #1 smoked sheet Philblack E, 40 parts hydroxytitanium stearate, 2 parts | 54.5 |
| GR-S¹ Philblack E, 40 parts | 39 |
| GR-S¹ Philblack E, 40 parts hydroxytitanium stearate, 2 parts | 39 |

¹ As in Example V.

It is evident that the presence of hydroxytitanium stearate gives an appreciable increase in the Mooney value of natural rubber-carbon black compositions but not GR-S-carbon black rubber.

*Example VIII*

The effect of hydroxytitanium stearate on the bound rubber content of both natural rubber and GR-S compositions containing carbon black was studied. Bound rubber was determined in the manner described in Example I. The compositions studied and the bound rubber content are shown below:

| Composition | Bound rubber, percent | |
|---|---|---|
| #1 smoked sheet, 100 parts Philblack E, 40 parts | ² 37.5 | ³ 54.7 |
| #1 smoked sheet, 100 parts Philblack E, 40 parts hydroxytitanium stearate, 2 parts | ² 42.2 | ³ 65.1 |
| GR-2,¹ 100 parts Philblack E, 40 parts | ² 28.8 | ³ 40.6 |
| GR-2,¹ 100 parts Philblack E, 40 parts Hydroxytitanium stearate, 2 parts | ² 27.8 | ³ 41.4 |

¹ As in Example V.
² Determined as in Example I.
³ Compositions were milled as before, heated 3 hours at 140° C. in an atmosphere of nitrogen, and then extracted with benzene. The insoluble polymer was regarded as bound rubber.

*Example IX*

Butadiene was polymerized in the presence of a triisobutylaluminum/titanium tetraiodide catalyst in accordance with the following recipe:

| | Parts by weight |
|---|---|
| Butadiene | 100 |
| Toluene | 900 |
| Triisobutylaluminum | 0.674 |
| Titanium tetraiodide | 0.504 |

Polymerization was effected in a 20-gallon reactor. The toluene was charged first followed by the triisobutylaluminum, butadiene, and titanium tetraiodide, in that order, at 10° F. Polymerization temperature was held at 20° F. up to 51 percent conversion when it began to increase slowly and reached 36° F. at blowdown. A 67 percent conversion was obtained in 17 hours and the polymer had a Mooney value (ML-4) of 73. The weight ratio of triisobutylaluminum/TiI₄ was 1.34/1. The polymer solution was washed with dilute sulfuric acid to reduce the iodine and ash in the polymer. Infrared analysis for the cis, trans, and vinyl content gave the following results: cis, 94.2 percent; trans, 2.3 percent; vinyl, 3.5 percent.

The effect of hydroxytitanium stearate as a compounding ingredient in super abrasion furnace black (Philblack E)—cis-polybutadiene compositions was investigated using the following compounding recipe:

| | Parts by weight |
|---|---|
| Cis-polybutadiene | 100 |
| Philblack E | 40 |
| Zinc oxide | 3 |
| Stearic acid | 2 |
| Resin 731 ¹ | 3 |
| Flexamine ² | 1 |
| Sulfur | 1 |
| Santocure ³ | 1 |
| Hydroxytitanium stearate | 2.0 |

¹ A disproportionated pale rosin stable to heat and light.
² A physical mixture containing 65 percent of a complex diarylamine-ketone reaction product and 35 percent of N,N'-diphenyl-p-phenylenediamine.
³ N-cyclohexyl-2-benzothiazylsulfenamide.

All compounding ingredients except the hydroxytitanium stearate were milled into the cis-polybutadiene on a roll mill, the compounded stock was taken off the mill and allowed to stand an hour, and the hydroxytitanium stearate was incorporated into one portion of the compounded stock during a remilling operation. The stocks were cured 45 minutes at 307° F. and physical properties determined. Results were as follows:

| | Hydroxytitanium Stearate, Parts | |
|---|---|---|
| | 2 | 0 |
| Unaged samples: | | |
| Compounded Mooney | 64.5 | 68 |
| ν x 10⁴, moles/cc.¹ | 1.63 | 1.65 |
| 300% modulus, p.s.i. | 760 | 760 |
| Tensile, p.s.i. | 3,800 | 3,280 |
| Elongation, percent | 840 | 770 |
| Shore hardness | 57 | 57 |
| Δ T° F. | 48.7 | 53.0 |
| Resilience, percent | 73.9 | 74.5 |
| Oven aged 24 hours at 212° F.: | | |
| 300% modulus, p.s.i. | 1,100 | 1,110 |
| Tensile, p.s.i. | 3,180 | 3,030 |
| Elongation, percent | 590 | 580 |
| Δ T° F. | 41.5 | 45.9 |
| Resilience, percent | 76.9 | 76.6 |

¹ The density of network chains is related to the number of crosslinks by the function $$\nu = 2n - \frac{2\delta}{M}$$

where $n$ is the number of crosslinks, $\delta$ is the density of the polymer and $M$ is the molecular weight.

The above data show tensile improvement in both the aged and unaged samples which contained hydroxytitanium stearate. Also a surprising decrease in heat build-up is evident.

*Example X*

Butadiene was polymerized using the recipe and procedure given in Example IX. Polymerization temperature was held at 20° F. throughout the run. A conversion of 70 percent was reached in 20.9 hours and the polymer had a Mooney value (ML-4) of 34. Infrared analysis gave the following cis, trans, and vinyl content: cis, 94.4 percent; trans, 2.2 percent; vinyl, 3.4 percent.

The effect of variable quantities of hydroxytitanium stearate in Philblack E-cis-polybutadiene compositions was investigated using the following compounding recipes:

| | Recipes (parts by weight) | | | |
|---|---|---|---|---|
| | 1 | 2 | 3 | 4 |
| cis-Polybutadiene | 100 | 100 | 100 | 100 |
| Philblack E | 40 | 40 | 40 | 40 |
| Zinc oxide | 3 | 3 | 3 | 3 |
| Stearic acid | 2 | 2 | 2 | 2 |
| Resin 731 [1] | 3 | 3 | 3 | 3 |
| Flexamine [1] | 1 | 1 | 1 | 1 |
| Sulfur | 1.3 | 1.3 | 1.3 | 1.4 |
| Santocure [1] | 1 | 1 | 1 | 1 |
| Hydroxytitanium stearate | 0 | 1 | 2 | 5 |

[1] As in Example IX.

The stocks were milled and the hydroxytitanium stearate added as described in Example IX. They were cured 30 minutes at 307° F. and physical properties determined. The following results were obtained:

| | Hydroxytitanium stearate, parts | | | |
|---|---|---|---|---|
| | 0 | 1 | 2 | 5 |
| Unaged samples: | | | | |
| $\nu \times 10^4$, moles/cc | 1.83 | 1.84 | 1.80 | 1.77 |
| 300% modulus, p.s.i | 730 | 730 | 740 | 720 |
| Tensile, p.s.i | 3,470 | 3,490 | 3,740 | 3,980 |
| Elongation, percent | 790 | 830 | 850 | 890 |
| Shore hardness | 57 | 57 | 57 | 56 |
| $\Delta$ T° F | 47.9 | 50.7 | 50.3 | 51.7 |
| Resilience, percent | 71.6 | 71.9 | 73.0 | 73.2 |

As shown above, the tensile strength is increased with increasing amounts of hydroxytitanium stearate with the most marked change occurring with between 1 and 2 parts of additive. The specimen containing 5 parts of acylate appeared to be less tightly cured. The evidence in improvement in resilience tends to offset the lack of improvement in heat build-up for these samples.

*Example XI*

A blend containing equal parts by weight of the cis-polybutadiene described in Example X and natural rubber (#1 smoked sheet) was prepared and compounded in accordance with the following formulation:

| | Parts by weight |
|---|---|
| Rubber blend | 100 |
| Philblack E | 40 |
| Zinc oxide | 3.5 |
| Stearic acid | 4 |
| Flexamine [1] | 1 |
| Santocure [1] | 1 |
| Sulfur | 1.6 |
| Hydroxytitanium stearate | 2.0 |

[1] As in Example IX.

The hydroxytitanium stearate was incorporated into the rubber as in the preceding examples and the stocks were cured 45 minutes at 280° F. Results of physical tests were as follows:

| | Hydroxytitanium Stearate, Parts | |
|---|---|---|
| | 2 | 0 |
| Unaged samples: | | |
| $\nu \times 10^4$, moles per cc.[1] | 2.04 | 2.03 |
| 300% modulus, p.s.i | 1,450 | 1,440 |
| Tensile, p.s.i | 4,440 | 4,270 |
| Elongation, percent | 650 | 620 |
| Shore hardness | 63 | 63 |
| $\Delta$ T° F | 47.9 | 49.7 |
| Resilience, percent | 72.9 | 70.6 |
| Oven aged 24 hours at 212° F.: | | |
| 300% modulus, p.s.i | 1,930 | 1,780 |
| Tensile, p.s.i | 3,550 | 3,410 |
| Elongation, percent | 470 | 480 |
| $\Delta$ T° F | 39.2 | 43.3 |
| Resilience, percent | 74.9 | 73 |

The above data show that natural rubber-synthetic cis-polymer blends can be improved by the method of our invention in a manner comparable to the enhancement of natural rubber and synthetic cis-polymers individually. As shown above, the cured blend is improved in tensile strength and hysteresis with lower heat build-up and increased resilience on both the aged and unaged stock.

*Example XII*

Cis-polyisoprene was prepared by polymerization of isoprene in accordance with the following recipe:

| | Parts by weight |
|---|---|
| Isoprene | 100 |
| Toluene | 440 |
| Triisobutylaluminum [1] | 0.495 (2.5 mmoles) |
| Titanium tetrachloride [2] | 0.528 (2.78 mmoles) |

[1] Charged as a 0.441 molar solution in toluene.
[2] Charged as a 0.294 molar solution in toluene.

Polymerization was effected in bottles with the temperature being regulated at 30° C. A conversion of 60 percent was obtained in 24 hours. The polymer was gel free and had an inherent viscosity of 2.74. Polyisoprene prepared as described above has a cis content of at least 90 percent.

Two samples of the cis-polyisoprene were compounded, one with and the other without hydroxytitanium stearate. Compounding recipes were as follows:

| | Parts by weight | |
|---|---|---|
| cis-Polyisoprene | 100 | 100 |
| Philblack E | 40 | 40 |
| Zinc oxide | 4 | 4 |
| Stearic acid | 3 | 3 |
| Flexamine [1] | 1 | 1 |
| Sulfur | 2 | 2 |
| Santocure [1] | 0.5 | 0.5 |
| Hydroxytitanium stearate | 0 | 2 |

[1] As in Example IX.

The compounded stocks were cured 30 minutes at 307° F. and physical properties determined. Results were as follows:

| | Hydroxytitanium Stearate, Parts | |
|---|---|---|
| | 2 | 0 |
| Unaged samples: | | |
| Compounded Mooney (MS-1½) | 29 | 31 |
| 300% modulus, p.s.i | 950 | 990 |
| Tensile, p.s.i | 3,720 | 3,370 |
| Elongation, percent | 710 | 650 |
| $\Delta$ T° F | 41.2 | 38.5 |
| Resilience, percent | 71.9 | 73.2 |
| Shore hardness | 51 | 52 |
| Oven aged 24 hours at 212° F.: | | |
| 300% modulus, p.s.i | 1,340 | 1,320 |
| Tensile, p.s.i | 3,580 | 3,120 |
| Elongation, percent | 590 | 530 |

As shown by the above data, cis-polyisoprene (synthetic natural rubber) is improved considerably in tensile strength on both aged and unaged stock by the addition of hydroxytitanium strearate.

The foregoing specification should be considered as illustrative of the invention, not limiting. For example, the acylate may be incorporated into the rubber by means other than those described, as by treating the carbon black with the acylate prior to the addition of the black to the rubber. Such a treatment can be accomplished by immersing the carbon black in a solution of acylate and then evaporating the solvent to leave the acylate adsorbed on the surface of the black. Other modifications of our invention as will be evident to those skilled in the art, can be made, or followed, in the light of this foregoing disclosure and discussion, without departing from the spirit or scope thereof.

We claim:
1. A rubber composition having improved tensile strength comprising a major amount of cis-conjugated diene polymer selected from the group consisting of natural rubber and synthetic polymers of conjugated dienes having from 4 to 8, inclusive, carbon atoms per molecule containing at least 80 percent cis-1,4 addition, a minor amount of carbon black and hydroxytitanium acylate represented by the formula

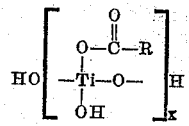

where $x=5-100$ and each R is selected from the group consisting of alkyl, hydroxyalkyl, alkenyl and hydroxyalkenyl radicals and each acyl group contains 6–24 carbon atoms.

2. A rubber composition having improved tensile strength comprising a major amount of cis-conjugated diene polymer selected from the group consisting of natural rubber and synthetic polymers of conjugated diolefins having from 4 to 6, inclusive, carbon atoms per molecule containing at least 90 percent cis-1,4 addition, a minor amount of carbon black and hydroxytitanium acylate represented by the formula

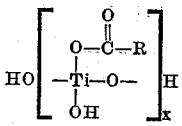

where $x=5-100$ and each R is selected from the group consisting of alkyl, hydroxyalkyl, alkenyl and hydroxyalkenyl radicals and each acyl group contains 6–24 carbon atoms.

3. Composition of claim 2 wherein the acylate is hydroxytitanium stearate.
4. Composition of claim 2 wherein the acylate is hydroxytitanium salt of soy oil acids.
5. Composition of claim 2 wherein the acylate is hydroxytitanium salt of coconut oil acids.
6. Composition of claim 2 wherein the acylate is hydroxytitanium salt of linseed oil acids.
7. Composition of claim 2 wherein the acylate is hydroxytitanium salt of castor oil acids.
8. A rubber composition having improved tensile strength comprising 100 parts by weight of cis-conjugated diene polymer selected from the group consisting of natural rubber and synthetic polymers of conjugated diolefins having from 4 to 6, inclusive, carbon atoms per molecule containing at elast 90 percent cis-1,4 addition, about 40 to 50 parts by weight of carbon black, and 1.5 to 10 parts by weight of hydroxytitanium acylate represented by the formula

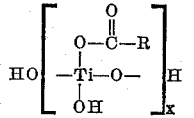

where $x=5-100$ and each R is selected from the group consisting of alkyl, hydroxyalkyl, alkenyl and hydroxyalkenyl radicals and each acyl group contains 6–24 carbon atoms.

9. A composition according to claim 8 wherein said carbon black is selected from the group consisting of high abrasion furnace black and super abrasion furnace black.

10. A rubber composition having improved tensile strength and abrasion resistance comprising a major amount of natural rubber and minor amounts of carbon black and hydroxytitanium acylate represented by the formula

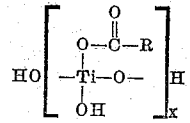

where $x=5-100$ and each R is selected from the group consisting of alkyl, hydroxyalkyl, alkenyl and hydroxyalkenyl radicals and each acyl group contains 6–24 carbon atoms.

11. A rubber composition having improved tensile strength and abrasion resistance comprising a major amount of natural rubber, a minor amount of carbon black filler, and 0.5–10 parts by weight/100 parts by weight rubber of a hydroxytitanium acylate represented by the formula

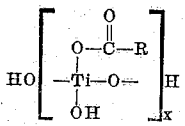

where $x=5-100$ and each R is selected from the group consisting of alkyl, hydroxyalkyl, alkenyl, and hydroxyalkenyl radicals and each acyl group contains 6–24 carbons.

12. A rubber composition having improved tensile strength and abrasion resistance comprising 100 parts by weight of natural rubber, 40–50 parts by weight of carbon black, and 1.5 to 5 parts by weight of hydroxytitanium acylate represented by the formula

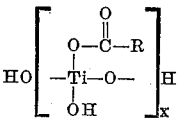

where $x=5-100$ and each R is selected from the group consisting of alkyl, hydroxyalkyl, alkenyl, and hydroxyalkenyl radicals and each acyl group contains 6–24 carbon atoms.

13. A rubber composition having improved tensile strength comprising a major amount of cis-polybutadiene containing at least 90 percent cis-1,4 addition, a minor amount of carbon black, and 0.5 to 10 parts by weight per 100 parts of cis-polybutadiene of a hydroxytitanium acylate represented by the formula

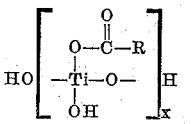

where $x=5-100$ and each R is selected from the group consisting of alkyl, hydroxyalkyl, alkenyl and hydroxyalkenyl radicals and each acyl group contains 6–24 carbon atoms.

14. A rubber composition having improved tensile strength comprising a major amount of cis-polyisoprene containing at least 90 percent cis-1,4 addition, a minor amount of carbon black, and 0.5 to 10 parts by weight per 100 parts of cis-polyisoprene of a hydroxytitanium acylate represented by the formula

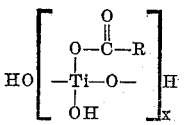

where $x=5-100$ and each R is selected from the group consisting of alkyl, hydroxyalkyl, alkenyl and hydroxyalkenyl radicals and each acyl group contains 6–24 carbon atoms.

15. In a process for the preparation of cis-conjugated diene polymer-carbon black compositions from rubbery material selected from the group consisting of natural rubber and synthetic polymers of conjugated dienes having from 4 to 8, inclusive, carbon atoms per molecule containing at least 80 percent cis-1,4 addition, the improvement comprising incorporating into the composition hydroxytitanium acylate represented by the formula

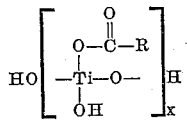

where $x=5-100$ and each R is selected from the group consisting of alkyl, hydroxyalkyl, alkenyl and hydroxyalkenyl radicals and each acyl group contains 6–24 carbon atoms.

16. In a process for the preparation of cis-conjugated diene polymer-carbon black composition from rubbery material selected from the group consisting of natural rubber and synthetic polymers of conjugated diolefins having from 4 to 6, inclusive, carbon atoms per molecule containing at least 90 percent cis-1,4 addition, the improvement comprising incorporating into the composition hydroxytitanium acylate represented by the formula

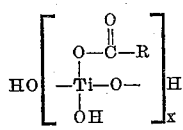

where $x=5-100$ and each R is selected from the group consisting of alkyl, hydroxyalkyl, alkenyl and hydroxyalkenyl radicals and each acyl group contains 6–24 carbon atoms.

17. Process of claim 16 wherein the composition is prepared by coating the carbon black with the acylate prior to the addition of the carbon black to the rubber.

18. Process of claim 16 wherein the hydroxytitanium acylate is added to a dispersion of the rubber which is in a form selected from the group consisting of latex and solution in a hydrocarbon solvent.

19. In a process for the preparation of a natural rubber-carbon black composition the improvement comprising incorporating into the composition hydroxytitanium acylate represented by the formula

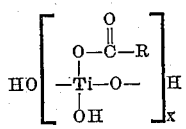

where $x=5-100$ and each R is selected from the group consisting of alkyl, hydroxyalkyl, alkenyl, and hydroxyalkenyl radicals and each acyl group contains 6–24 carbon atoms.

References Cited in the file of this patent

UNITED STATES PATENTS

| | | |
|---|---|---|
| 2,621,194 | Balthis | Dec. 9, 1952 |
| 2,875,919 | Henderson | Mar. 3, 1959 |

FOREIGN PATENTS

| | | |
|---|---|---|
| 1,139,418 | France | July 1, 1957 |